US006574752B1

(12) United States Patent
Ahrens et al.

(10) Patent No.: US 6,574,752 B1
(45) Date of Patent: Jun. 3, 2003

(54) METHOD AND SYSTEM FOR ERROR ISOLATION DURING PCI BUS CONFIGURATION CYCLES

(75) Inventors: George Henry Ahrens, Pflugerville, TX (US); John C. Kennel, Austin, TX (US); Jeffrey Scott Mayes, Austin, TX (US); Maulin Ishwarbhai Patel, Round Rock, TX (US); David Lee Randall, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,973

(22) Filed: Jul. 15, 1999

(51) Int. Cl.$^7$ ................................................ H02H 3/05
(52) U.S. Cl. .............................. 714/43; 714/6; 711/148
(58) Field of Search .............................. 714/43, 6, 12, 714/805; 709/216; 711/148; 713/2

(56) References Cited

U.S. PATENT DOCUMENTS

| 5,603,033 | A | | 2/1997 | Joannin ........................ 395/704 |
|---|---|---|---|---|
| 5,689,726 | A | | 11/1997 | Lin ............................. 395/830 |
| 5,692,219 | A | | 11/1997 | Chan et al. ................... 395/869 |
| 5,701,488 | A | | 12/1997 | Mulchandani et al. ...... 395/704 |
| 5,712,967 | A | | 1/1998 | Grossman et al. ........... 395/182 |
| 5,768,622 | A | | 6/1998 | Lory et al. ................... 395/855 |
| 5,793,987 | A | * | 8/1998 | Quackenbush et al. ..... 710/100 |
| 5,809,260 | A | | 9/1998 | Bredin ......................... 395/308 |
| 5,815,647 | A | | 9/1998 | Buckland et al. ........... 395/182 |
| 5,815,734 | A | | 9/1998 | Lee et al. .................... 395/880 |
| 5,819,053 | A | | 10/1998 | Goodrum et al. ........... 395/306 |
| 5,838,899 | A | | 11/1998 | Leavitt et al. ............... 395/185 |
| 5,838,932 | A | | 11/1998 | Alzien ......................... 395/308 |
| 5,850,562 | A | | 12/1998 | Crump et al. ............... 395/800 |
| 5,864,653 | A | | 1/1999 | Tavallaei et al. ............ 315/181 |
| 5,996,034 | A | * | 11/1999 | Carter ......................... 710/100 |

FOREIGN PATENT DOCUMENTS

| EP | 0820021 | 7/1997 | ..................... 13/14 |
|---|---|---|---|
| JP | 006813 | 6/1994 | |
| JP | 7123134 | 5/1995 | ..................... 29/14 |
| JP | 0954750 | 2/1997 | ..................... 13/28 |
| JP | 1030083 | 4/1997 | |
| WO | 9844417 | 10/1998 | ..................... 11/22 |

OTHER PUBLICATIONS

IBM Technical Disclosure Bulletin, vol. 39, No. 3, Mar. 1996, "Technique for Gaining Indefinite Access to Peripheral Component Interconnect* Bus Resource," pp. 361–362.
IBM Technical Disclosure Bulletin, vol. 38, No. 8, Aug. 1995, "Manufacturing Test Mode for the Peripheral Component Interconnect Bus," pp. 57–59.

(List continued on next page.)

Primary Examiner—Robert Beausoliel
Assistant Examiner—Rita A Ziemer
(74) Attorney, Agent, or Firm—Andrea Pair Bryant; Mark E. McBurney

(57) ABSTRACT

A method, system and computer program are described for isolating bus errors detected during system start-up by utilizing a technique in which a shared mailbox associated with a service processor is provided for holding the address of an adapter in an I/O drawer. If an error is detected the server processor is notified. The server processor then retrieves the address from the mailbox, uses it to derive a location code which is then passed along with the error code to an appropriate error analysis routine. The start-up procedure is then shut down.

16 Claims, 4 Drawing Sheets

OTHER PUBLICATIONS

D.R. Crandall, et al, "Self–Initiating Diagnostic Program Loader from Failed Initial Program Load I/O Device, " Research Disclosure, Jun. 1991, No. 326, Kenneth Mason Publications Ltd., England, 1 page.

IBM Technical Disclosure Bulletin, vol. 37, No. 8, Aug. 1994, "Method to Initialize the Error Handling Logic of a Peripheral Component Interconnect System," pp. 619–621.

Lauesen, S., "Debugging Techniques," Software—Practice and Experience, vol. 9, Issue 1, Jan. 1979, pp. 51–63.

Kanopoulos, M., "Design of a bus–monitor for real–time applications," Microprocessing & Microprogramming, vol. 24, No. 1–5, pp. 717–721, Aug. 1988.

"Early mode padding for Multifunction Hard Core Macro—using synthesis tools for solving early mode problems in implementation of hard core macro such as interfacing PCI bus," IBM 40788, Feb. 20, 1998, 1 page.

English Language Abstract downloaded and printed from WPAT database for patent No. SU1083194 dated Dec. 17, 1982.

Siewiorek, D. et al., "C.vmp: the Architecture and Implementation of a Fault Tolerant Multiprocessor," International Symposium on Fault–tolerant Computing, 7the, Los Angeles, Jun. 28–30, 1977, Proceedings, pp. 37–43.

* cited by examiner

METHOD AND SYSTEM FOR ERROR ISOLATION DURING PCI BUS CONFIGURATION CYCLES

BACKGROUND OF THE INVENTION

1. Technical Field

The present invention relates to error analysis in information processing systems. More specifically, it relates to isolation of faulty peripheral component interface (PCI) adapters on a PCI bus during input/output sub-system initialization.

2. Description of the Related Art

When a failure occurs on a PCI bus, after system start-up but before machine check handling has been enabled, it is desirable to automatically determine which adapter is responsible for the fault condition. This procedure is difficult because prior to enabling machine check handling, the error condition will checkstop the system. Since there is no scan out capability on the remote I/O drawers where the PCI devices are located, it is not possible to scan out error registers for interrogation. A conventional service procedure is based on treating every bus adapter as suspect. System configuration is modified to comprise its minimum configuration; and, thereafter each adapter card is sequentially tried until the failure occurs in that configuration.

Such a scheme for recreating an error condition in order to identify the faulty adapter is problematic. The procedure often induces additional errors due to physically plugging and unplugging adapter cards. Further, such a sequential procedure adds considerable time to any error repair scenarios.

Check pointing during system startup to determine faulty components is a procedure known in the art. Typically, in a check point procedure, a periodic copy of a program or the state of a computer system is made so that if a failure occurs, recovery can be initiated from the last saved checkpoint and restarted. This invention uses the concept of checkpoints to save the last known PCI address that was attempted to be accessed during the PCI configuration cycle to identify the probable source of failure. In addition, progress codes are presented by the initial program load read only storage (IPLROS) firmware to indicate the progress of the boot sequence. The progress code will indicate that the PCI bus was being configured and the checkpoint will be used to identify the probable source of the failure.

Commonly assigned co-pending application Ser. No. 08/829,088 entitled "A Method and System for Fault Isolation for PCI Bus Errors" teaches a mechanism for identifying a source of an error condition in the I/O mechanism.

U.S. Pat. No. 5,815,647 to Buckland et al., provides a system which allows a user to identify which of a plurality of feature cards has issued an error signal.

IBM Technical Disclosure Bulletin, Vol. 37, No. 08, page 619, discloses a recursive algorithm for initializing error handling logic for a PCI system.

None of these references provides for saving an address indicator prior to accessing that address.

Thus, it is desirable to have a speedy, certain technique for identifying faulty components which prevent a system from completing system start-up and entering its diagnostic routines.

It is further desirable to isolate and diagnose errors in a manner that eliminates the possible introduction of further error conditions.

BRIEF SUMMARY OF THE INVENTION

The present invention overcomes the shortcomings of the prior art by providing a shared mailbox space in memory for use by a service processor during PCI bus and adapter initialization sequence. The address of an adapter is placed in the shared memory space before an attempt to access that adapter is made. If an error occurs during the access attempt, the service processor retrieves the address saved in the shared mailbox and immediately performs its error isolation procedure for determining the slot at fault. In this way the adapter card causing an I/O subsystem failure, rather than the entire I/O subsystem, may be analyzed.

BRIEF DESCRIPTION OF THE DRAWINGS

The above and other features and advantages of a preferred embodiment of the present invention will be described in conjunction with the following drawings wherein.

DETAILED DESCRIPTION OF THE PREFERRED EMBODIMENT

Figure 1A:
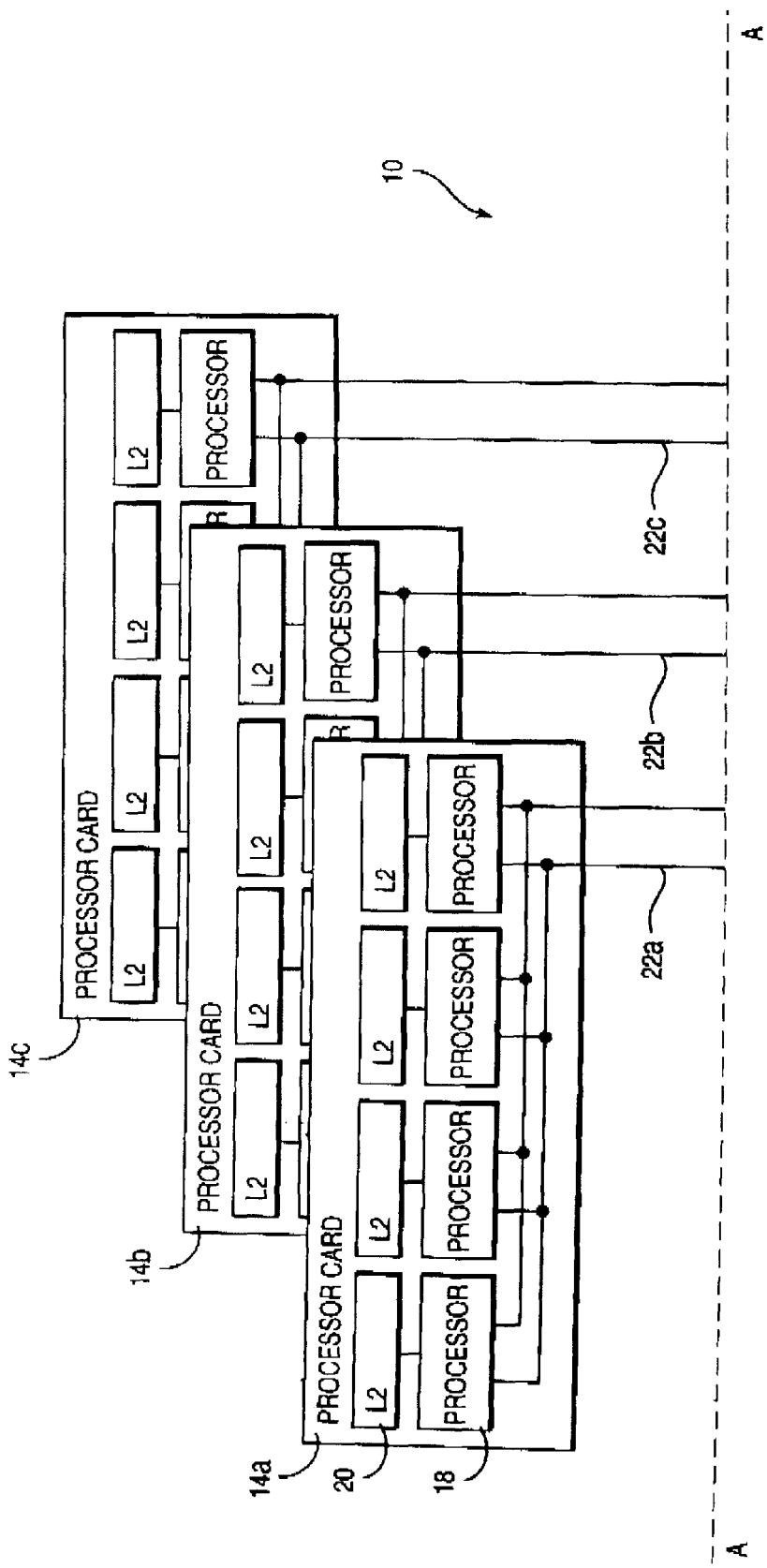
FIG. 1 depicts a block diagram of a data processing system in which a preferred embodiment of the present invention may be implemented.

With reference now to the figures and in particular with reference to FIG. 1, there is depicted a block diagram of an illustrative embodiment of a data processing system or information handling system with which the present invention may advantageously be utilized. The illustrative embodiment depicted in FIG. 1 is a workstation or server computer system; however, as will become apparent from the following description, the present invention may also be applied to any other data processing or information handling system.

Figure 1B:
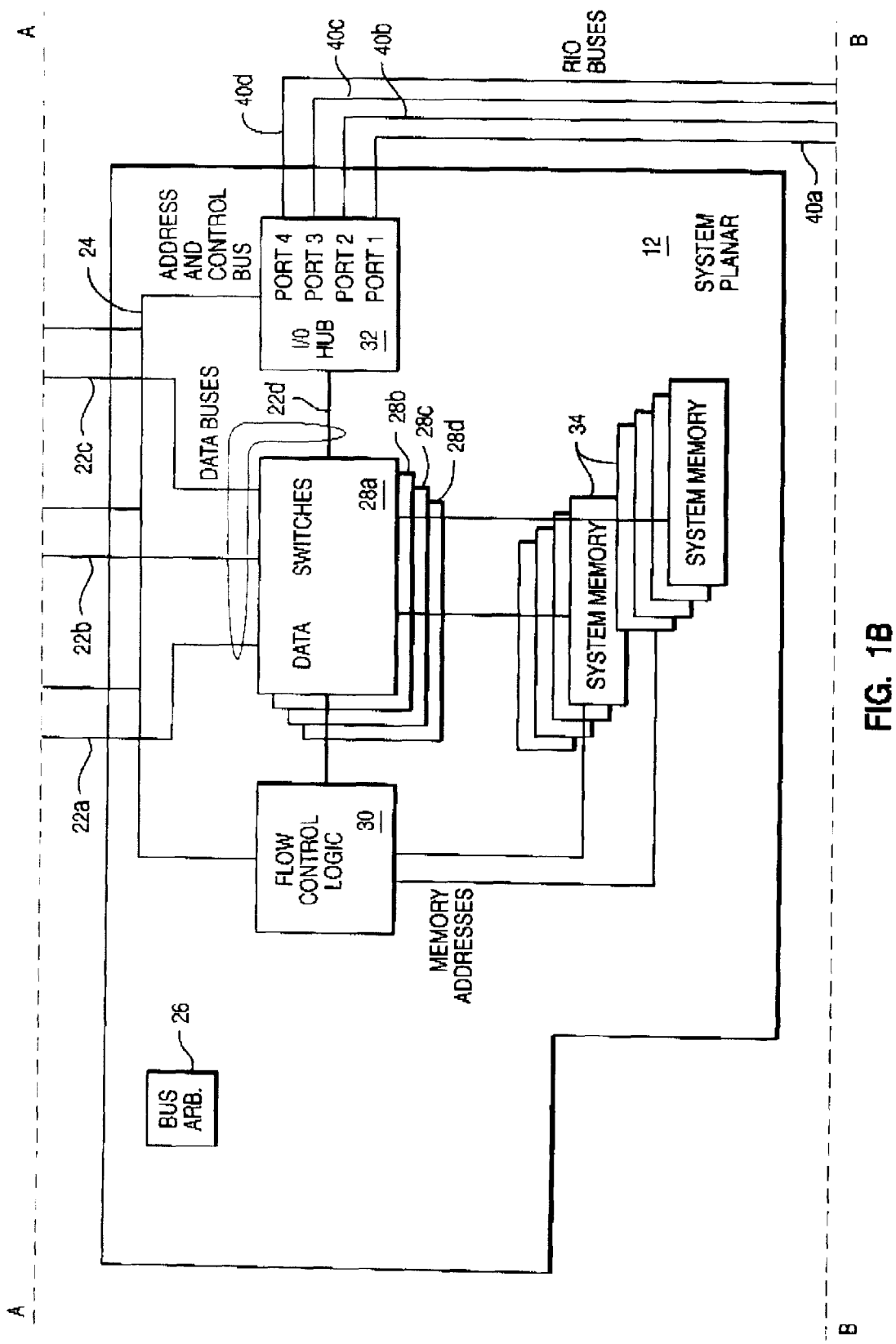

As illustrated in FIG. 1B, data processing system 10 includes a system planar 12 coupled to one or more processor cards (in this case processor cards 14a–14c) and one or more input/output (I/O) drawers (in this case drawers 16a–6d). In the depicted embodiment, each processor card 14 carries four general purpose processors 18 each of which has an on-chip level one (L1) cache (not illustrated) and an associated level two cache 20 that provide low latency storage for instructions and data. Processors 18 on each processor card 14 are all connected to address and control bus 24 and to an associated data bus 22a–22c.

As illustrated, system planar 12 includes a bus arbiter 26 that regulates access to address and control bus 24 by processors 18, as well as flow control logic 30 and I/O hub 32, which are each connected to address and control bus 24. Flow control logic 30 is further connected to dual-ported system memory 34 and data switches 28a–28d, and I/O hub 32 is further connected to data switches 28 by data bus 22d and to each of I/O drawers 16a–16d by a respective one of primary remote I/O (RIO) buses 40a–40d. Address transactions issued on address and control bus 24 are received by both flow control logic 30 and I/O hub 32. If an address transaction specifies an address associated with a location in system memory 34, flow control logic 30 forwards the address to system memory 34 as an access request. Alternatively, if the address transaction specifies a memory mapped I/O address associated with an I/O device contained in one of I/O drawers 16a–16d, I/O hub 32 routes the address transaction to the appropriate I/O drawer 16 via its primary RIO bus 40. Flow control logic 30 also supplies control signals to data switches 28 to control the flow of data transactions between processor cards 14 and system memory 34 and I/O hub 32.

Figure 1C:
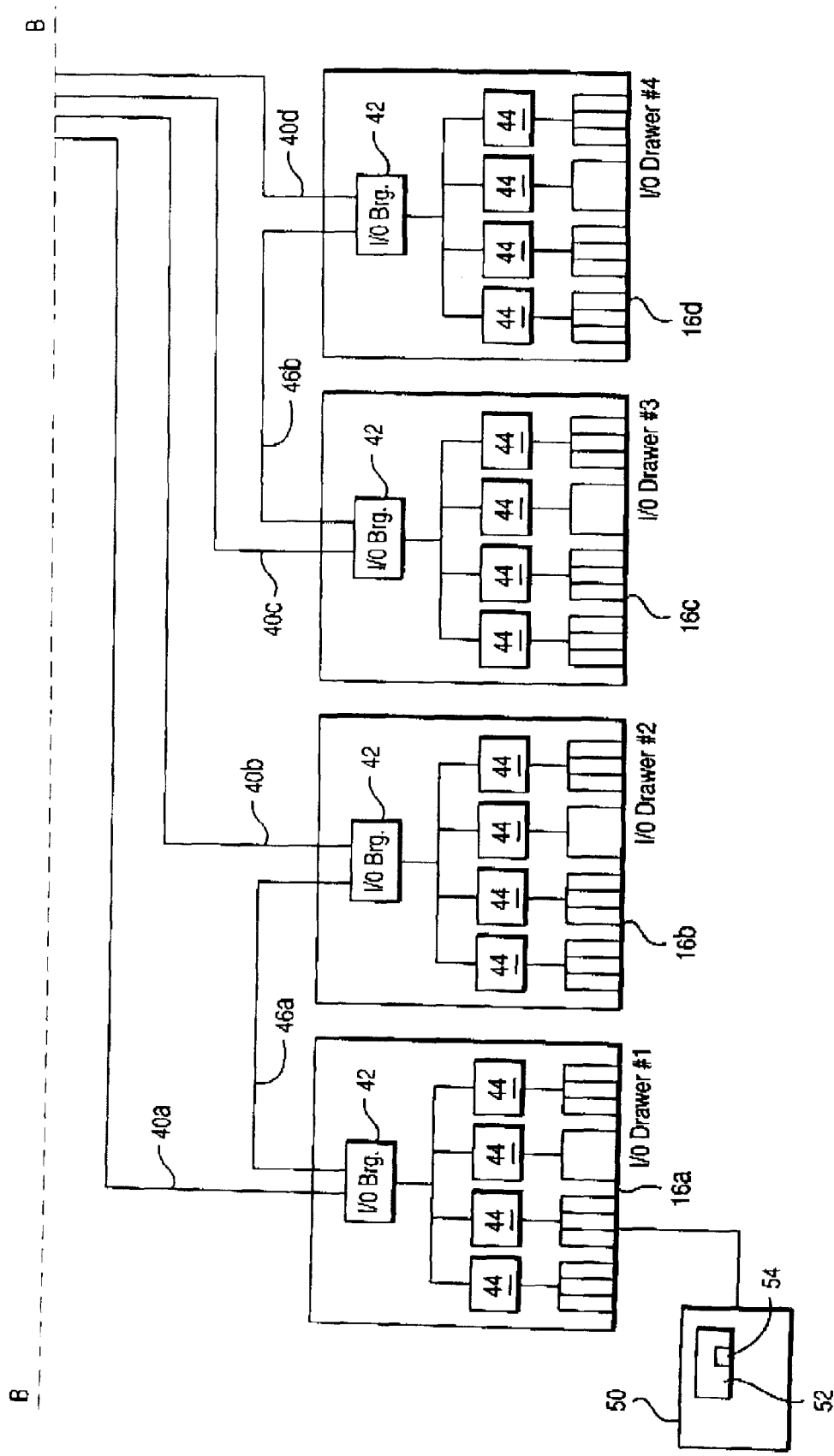

Referring now to I/O drawers 16a–16d, each I/O drawer 16 contains an I/O bridge 42 that is directly connected to I/O hub 32 by its respective primary RIO bus 40 and is coupled either directly or indirectly to I/O hub 32 via a secondary RIO bus 46 e.g., either secondary RIO bus 46a or 46b). That is, in embodiments of data processing system 10 in which only a single I/O drawer 16 is installed, I/O bridge 42 is directly connected to I/O hub 32 by both a primary RIO bus 40 and a secondary RIO bus 46. In other embodiments in which multiple I/O drawers 16 are installed, each I/O drawer 16 is connected to I/O hub 32 by a single primary RIO bus 40 and is connected to another I/O drawer 16 through a secondary RIO bus 46. Thus, I/O hub 32 has redundant paths through which it can communicate to each installed I/O drawer 16. Each I/O bridge 42 is connected to up to four peripheral component interconnect (PCI) bus controllers 44, which each supply connections for up to four PCI devices. As shown in FIG. 1C, the PCI devices installed in drawer 16a include service or local processor 50 and nonvolatile random access memory (NVRAM) 52. Other PCI devices that may be attached to PCI controllers 44 of I/O drawers 16a–16d include small computer system interface (SCSI) adapters, local area network (LAN) adapters, etc.

Routines for performing analysis on PCI bus initialization errors are resident in service processor 50. NVRAM 52 is provided for, inter alia, containing the shared mailbox 54 of the present invention. In this manner, direct access to the mailbox is enabled when, in accordance with a preferred embodiment of the present invention, an architected location indicator of a failing PCI device must be retrieved in the course of performing error analysis.

Figure 2:
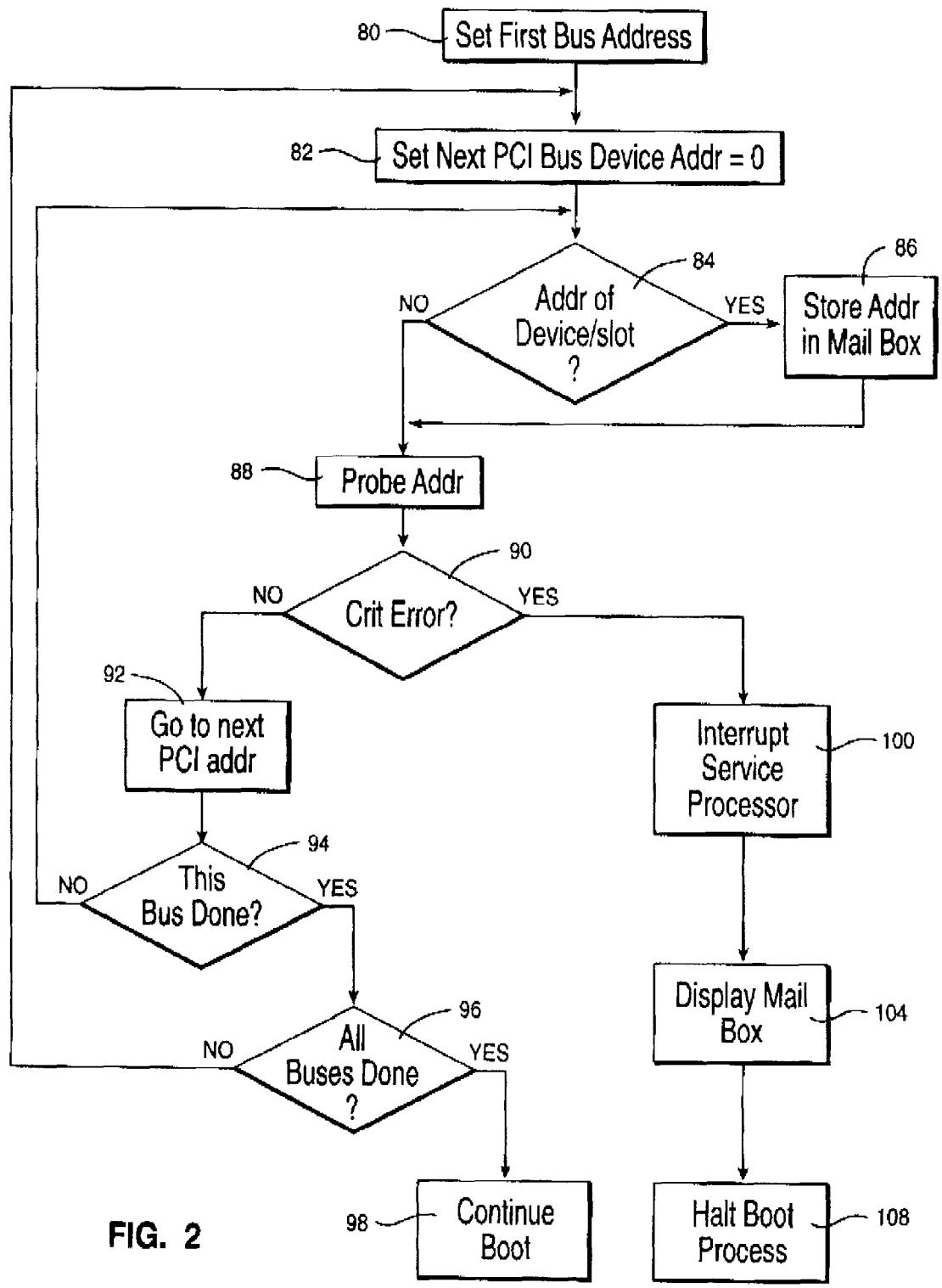
FIG. 2 illustrates the logic executed within processor 18 and service processor 50 of FIG. 1.

Refer now to FIG. 2, a flow chart of the error isolation logic executed within service processor 50 and system processor 18, FIG. 1. Steps 80 through 98 are executed by system processor 18 as part of an initialization process run in preparation for operating system load. Steps 100 through 108 show the error isolation process executed with in service processor 50.

The error isolation method of the present invention begins at step 80 during system start-up. That step sets the first PCI bus address. At step 82 the PCI bus device address is set equal to zero. At test 84 the logic determines whether the address in question represents a device slot. If the address is that of a device slot, at step 86 that address is stored in the mailbox in NVRAM 52, FIG. 1.

If, however, the address is not that of a device slot, then at step 88 the address is probed by having the PCI issue a command and await a response. If at test 90 it is determined by examination of the response that a critical PCI configuration cycle error has occurred, then the logic branches to step 100. If the result of test 90 is negative, then at step 92 the logic proceeds to the next PCI address. At test 94 the logic determines if it has completed checking all addresses associated with a bus, and if not, the logic returns to test 84 and looks at the next address. If however, all addresses on that bus have been examined, then at test 96 the logic determines if all the buses are done. If not, the logic returns to step 82 where the next PCI bus device address is set to zero. If all buses are finished, then at step 98 the normal boot process continues.

Returning now to test 90, if it is determined that a critical PCI configuration cycle error has occurred, then at step 100 an interrupt is raised to service processor 50. At step 104 the service processor displays the address previously stored in the mailbox at step 86. As is well understood in the art, the display may be an operator panel which, for example, may be a 2 line×16 digit liquid crystal device (LCD).

Various error analysis routines which are not part of the present invention may then be performed. Then at step 108 the system start-up routine is halted. In summary, the present invention performs error isolation by using a combination of the progress code, which indicates that the system was performing PCI configuration, and the address information in mailbox register 54 to provide an architected location code to identify the failing PCI adapter.

In accord with the present invention, the address of the PCI adapter is placed in a mailbox register 54 in NVRAM 52 space which is accessible by both the IPLROS code which is performing PCI bus initialization and by service processor 50 which is responsible for servicing failure scenarios.

The role of service processor 50 is to identify the type of failure and provide isolation to the faulty component. On the occurrence of a PCI failure during the PCI configuration cycle, the system will checkstop, thus preventing system processor 18 from executing any more instructions. Service processor 50 then interrogates mailbox register 54 to determine if a valid PCI address has been saved therein. If so, service processor 50 uses the architected location code in mailbox register 54 to indicate the physical location of the PCI adapter in the remote I/O drawer that caused the failure.

The present invention is also applicable to other bus types, such as ISA, as those skilled in the art will appreciate.

While a preferred embodiment of the present invention has been described having reference to a particular system configuration, modifications in form and detail may be made without departing from the spirit and scope of the invention as described in the following claims.

What is claimed is:

1. A data processing system including a service processor and a plurality of PCI adapters, the improvement comprising:

means, operable during system start-up, for saving in a mailbox, accessible by said service processor, an address of a first adapter;

means for sequentially determining whether an error arises upon accessing a device slot associated with said adapter;

means for passing said address to an error processing routine when an error occurs;

means for replacing said address with a next adapter address if no error occurs; and means for continuing system start-up processing.

2. The system of claim 1 wherein:

said service processor includes means for displaying an address at which an error arises.

3. The system of claim 2 wherein said mailbox is accessible by error analysis routines in said service processor.

4. A method for isolating errors occurring during bus configuration comprising the steps of:

saving an adapter address in a mailbox before any attempt at adapter access;

accessing said adapter address;

replacing said adapter address in said mailbox with a next adapter address if said accessing step is successful; and utilizing said adapter address in error analysis if said accessing step is unsuccessful; and repeating said accessing and replacing steps until all adapters have been accessed.

5. The method of claim 4 wherein said accessing step includes:

sequentially accessing each device address associated with an adapter before executing said replacing step.

6. The method of claim 4 including after said repeating step the additional step of continuing system start-up processing.

7. The method of claim 4 including after said utilizing step, the additional step of:

halting system start-up processing.

8. An information handling system including a plurality of bus adapters and an improved I/O subsystem service processor, comprising:

means for saving an adapter address in a mailbox before any attempt at adapter access;

means for accessing said adapter address;

means for replacing said adapter address in said mailbox with a next adapter address if said accessing step is successful; and means for utilizing said adapter address in error analysis if said accessing step is unsuccessful; and means for repeatedly causing operation of said means for accessing and said means for replacing until all adapters have been accessed.

9. The service processor of claim 8 wherein said means for accessing comprises;

means for sequentially accessing said adapter address;

means for sequentially replacing said adapter address in said mailbox with a next adapter if said accessing step is successful; and means for sequentially utilizing said adapter address in error analysis if said accessing step is unsuccessful; and means for sequentially repeatedly causing operation of said means for replacing until all adapters have been accessed.

10. The service processor of claim 9 additionally including means, operable after said means for repeating, for continuing system start-up processing.

11. The service processor of claim 10 additionally including:

means operable after said means for utilizing for halting system start-up processing.

12. A computer program having data structures included on a computer readable medium, for a service processor for use during bus configuration cycles to isolate errors to one of a plurality of bus connected adapters comprising:

means for saving an adapter address before accessing that adapter;

means for testing said adapter;

means for replacing said saved adapter address with a next address if said means for testing returns no error; and means for using said adapter address in further error and analysis if said means for testing returns an error indicator.

13. The computer program of claim 12 wherein:

said means for saving includes means for storing said adapter address in a mailbox associated with said service processor.

14. The computer program of claim 13 wherein said means for testing comprises:

means for issuing write and read commands to said adapter;

means for interpreting a response from said adapter; and means for raising an interrupt to said service processor if said response is an error code.

15. The computer program of claim 14 wherein said means for issuing comprises:

means for initiating a write to an adapter configuration address port; and means for performing an I/O read from or a write to an adapter configuration data port.

16. The computer program of claim 15 wherein said means for using includes:

means for retrieving said adapter address from said mailbox;

means for translating said address to an actual adapter slot location; and means for displaying an error code with a translated address.

* * * * *